3,261,879
OLEFIN DISPROPORTIONATION
Robert L. Banks, Bartlesville, Okla., assignor to Phillips Petroleum Company, a corporation of Delaware
Filed Sept. 27, 1963, Ser. No. 312,209
19 Claims. (Cl. 260—683)

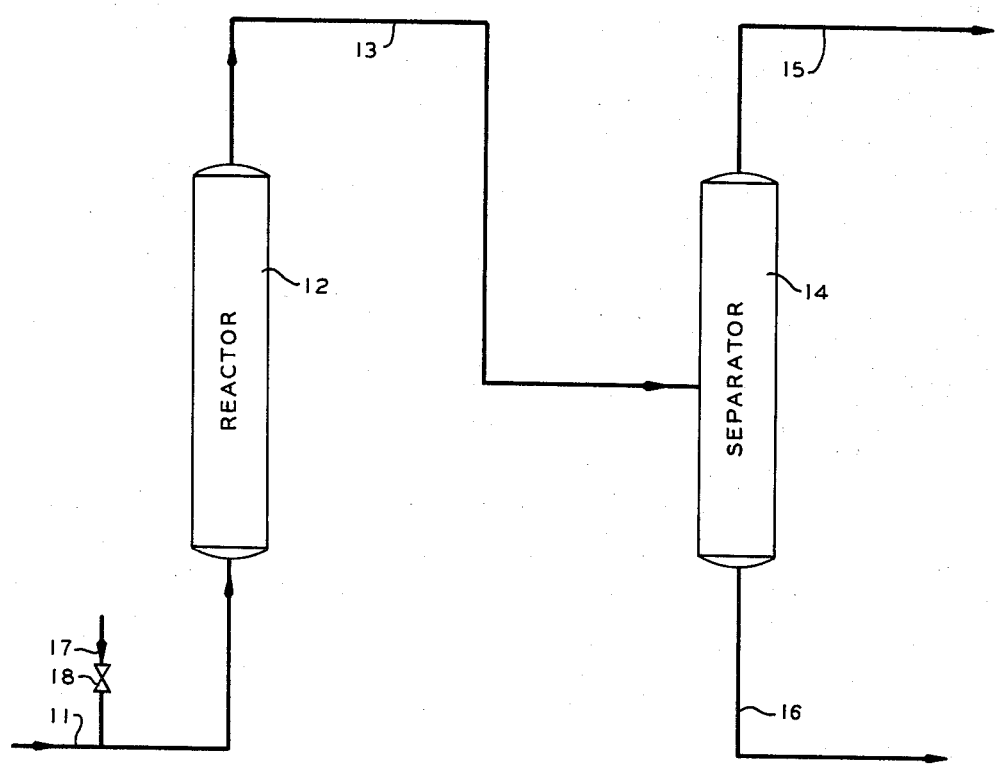

This application is a continuation-in-part of my earlier filed application Serial No. 127,812, filed July 31, 1961, titled "Olefin Disproportionation," now abandoned.

This invention relates to the disproportionation of olefin hydrocarbons. In one aspect the invention relates to the disproportionation of olefin hydrocarbons by contact with a catalyst comprising molybdenum oxide or tungsten oxide and aluminum oxide. In another aspect this invention relates to a process for the disproportionation of an olefin hydrocarbon by contact with a catalyst comprising molybdenum oxide, aluminum oxide and an oxide of cobalt. In another aspect, this invention relates to catalysts for olefin hydrocarbon disproportionation.

By disproportionation in this application is meant the conversion of a hydrocarbon into similar hydrocarbons of higher and lower number of carbon atoms per molecule. Where the reactant comprises 1- or 2-olefins, a mixture of products is obtained comprising primarily olefins having both a larger and a smaller number of carbon atoms than the feed olefin but also including other disproportionated products, for example, saturated hydrocarbons, and other converted and unconverted material. Such an operation is useful in many instances. For example, a more plentiful hydrocarbon can be converted to a less plentiful and therefore more valuable hydrocarbon. One instance of such a conversion occurs when the process of this invention is used to convert both higher and lower molecular weight olefins to olefins in the $C_{10}$–$C_{16}$ range, a range of olefins especially suitable for the manufacture of detergents. Another instance of a disproportionation reaction having considerable value is the disproportionation of propylene to produce ethylene and butene.

An object of this invention is to convert an olefin feed to hydrocarbons of higher and lower molecular weight.

Another object of this invention is to provide a catalytic process for the conversion of acyclic olefins to higher and lower molecular weight hydrocarbons.

Another object of this invention is to provide catalysts for olefin hydrocarbon disproportionation.

Other aspects, objects and advantages of my invention are apparent in the written description, the drawing, and the claims.

According to my invention, the disproportionation of an olefin hydrocarbon is accomplished by contacting the hydrocarbon with a catalyst comprising molybdenum oxide and/or tungsten oxide and a catalyst base containing aluminum oxide.

Olefins which are subjected to disproportionation according to the process of this invention include acyclic olefins containing at least 3 carbon atoms per molecule and their aryl derivatives and mixtures thereof. A useful group of feed materials are acyclic monoolefins containing from 3 to 20 carbon atoms per molecule, and mixtures thereof, a preferred group being those acyclic monoolefins containing from 3 to 12 carbon atoms per molecule. At the present time most commercial applications of the invention occur within the group of acyclic monoolefin containing from 3 to 6 carbon atoms per molecule. Examples of compounds suitable for disproportionation according to this invention are acyclic 1- and 2-alkenes, and alkyl and aryl derivatives thereof having from 3 to 20 carbon atoms per molecule. Some specific examples of such olefins are propylene, 1-butene, 2-butene, 1-pentene, 2-pentene, 1-hexene, 2-heptene, 1-octene, 2-nonene, 1-dodecene, 2-tetradecene, 1-hexadecene, 2-methyl-1-butene, 2-methyl-2-butene, 3-methyl-1-butene, 1-phenylbutene-2, and 3-heptene. Higher disproportionation conversion and wider product distribution are obtained at comparable reaction times with 1-olefin than with 2-olefins. 3-olefins are disproportionated at still lower rates.

The feed should be essentially free of impurities which adversely affect the reaction. For example it has been found that, at concentrations of 300–2000 p.p.m., the following impurities reduce propylene conversion to ethylene and butenes in the practice of my invention: oxygen, water, carbon dioxide, hydrogen sulfide, ethyl sulfide, diethyl sulfide, methyl ethyl sulfide, acetylene, methylacetylene, propadiene, and butadiene. A subsequent reactivation of the catalyst to remove the effect of such impurities can be made repeatedly by heat treatment with air, using an inert gas to control burn-off temperature.

The catalyst used in my invention comprises an oxide of aluminum promoted by an oxide of molybdenum or an oxide of tungsten. Any conventional catalytic grade of alumina including the eta or gamma forms can be used. When the promoter is molybdenum oxide, the catalyst preferably is additionally promoted by an oxide of cobalt. The catalysts of my invention can contain other materials which do not substantially promote undesirable side reactions. For example the alumina base can contain silica, magnesia, titania, or other bases in amounts which do not change the essential characteristics of the reaction. For example, small amounts of silica or magnesia can be used to make the base more resistant to surface area reduction by contact with moisture. When silica is present, proportions of silica and alumina for which the support itself has appreciable activity for cracking or polymerization should be avoided. Suitable supports include 100% alumina, silica-alumina wherein the amount of silica is up to about 25%, of the total support; magnesia-alumina wherein the amount of magnesia is up to about 20% of the total support, and titania-alumina wherein the amount of titania is up to about 85% of the total support.

The amount of molybdenum oxide or tungsten oxide is in the range of 0.5 to 30 percent by weight of the total catalyst composition, preferably 1 to 15 percent. Cobalt oxide can be present in the molybdenum promoted catalyst in the range of 0 to 20 percent by weight of the total catalyst, preferably 1 to 5 percent. Excellent results with high conversion have been obtained with molybdenum oxide in the range of 4 to 13 percent by weight of the total catalyst.

The composite catalyst can be prepared by any conventional method such as dry mixing, coprecipitation or impregnation. For example, a 10–100 mesh alumina (having a 178 m.²/g. surface area and a 107 A. pore diameter) is impregnated with an aqueous solution of a molybdenum compound, such as ammonium molybdate, which is convertible to the oxide upon calcination. A commercially available catalyst comprising 12.8:3.8:83.4 $MoO_3$—$CoO$—$Al_2O_3$ having a 208 m.$^2$/g. surface and a 96 A. pore diameter is also satisfactory. Commercial molybdena or cobalt-molybdate on alumina catalysts, which catalysts generally contain between 8 and 15 percent by weight of the promoter, are satisfactory. To produce a catalyst containing silica, a catalytic grade alumina can be impregnated with ammonium molybdate, cobalt nitrate and ethyl silicate, or suitable cobalt, molybdenum and aluminum salts can be incorporated into a silicon-containing Kaolinite (a clay mineral—

$Al_2O_3 \cdot 2SiO_2 \cdot 2H_2O$)

extender.

Before use in the disproportionation reaction, the above-described composite catalysts are activated by a heat treatment. The catalysts are subjected to 700–1600° F. preferably 900–1400° F. for 0.5–20 hours or longer. Generally the longer activation periods are used with lower temperatures and shorter activation periods with higher temperatures. At temperatures of about 1100° F. and lower, long activation times, e.g. 50 hours or more are not harmful to activity. It is preferred that the catalyst treatment be carried out in an atmosphere of flowing, non-reducing gas. Activation in the presence of an atmosphere of a free oxygen containing gas, e.g. air, is preferred, but less active but effective catalysts for disproportionation can be obtained by activation with an inert gas, providing that at least a part of the activated species, at the completion of the treatment, is in the oxide form. Suitable gases for such an activation treatment include nitrogen, gas from an inert atmosphere generator (a conventional refinery apparatus in which natural gas or other combustible hydrocarbon gas is burned with a stoichiometric quantity of air, yielding an essentially non-reducing gas mixture), substantially non-reducing flue gases, carbon dioxide, helium, argon, krypton, neon, xenon, and radon. The presence of reducing gases during activation should be avoided. If reducing gases are present during this step, the amount should be small enough that the activity for disproportionation is not substantially reduced. For example, treatment with a substantial amount of a reducing gas, such as hydrogen, sulfur dioxide or hydrogen sulfide, either during or subsequent to initial activation, largely inactivates the catalyst for disproportionation. Such an inactive catalyst sometimes can be reactivated by a subsequent heat treatment of the kind used for initial activation.

Significant amounts of moisture in the activation gas, especially at higher temperatures are harmful to the catalyst by reducing the surface area.

In some cases the catalyst is serially heated in more than one gas. For example, the catalyst can be heated in air, then in nitrogen or other inert gas. Although, as noted above, the use of reducing gases during or following the initial activation is to be avoided, a controlled treatment with carbon monoxide subsequent to activation and prior to contact with the feed sometimes is beneficial to the catalyst for disproportionation. Preferred conditions for treatment with carbon monoxide are 300–1200° F., 0–1000 p.s.i.g., for one minute to five hours or longer.

In the practice of this invention, the catalyst can be used, without regeneration, for runs up to 80 hours or more, and can be regenerated repeatedly without serious damage. The regeneration can be accomplished, for example, by contact with diluted air, to remove accumulated coke. I have found that the presence of steam can be tolerated when activating or regenerating the catalysts of my invention. This is particularly true when a steam stable catalyst base, e.g. alumina with a small amount of silica or magnesia, is used.

The process of my invention can be carried out either batchwise or continuously, using a fixed catalyst bed, or a stirrer equipped reactor or other mobile catalyst contacting process as well as any other well known contacting technique. Preferred reaction conditions, e.g., temperature, pressure, flow rates, etc., vary somewhat depending upon the specific catalyst composition, the particular feed olefin, desired products, etc. The process is carried out at about 150–500° F., preferably 250–400° F., at pressures in the range of 0–1500 p.s.i.g. Although the disproportionation reaction of this invention is essentially independent of pressure, for most economical operation, considering combination with other steps of a complete plant operation including, for example, product separation and recovery, a pressure range of 200–600 p.s.i.g. can be used conveniently.

The operable range of contact time for the process of this invention depends primarily upon the operating temperature and the activity of the catalyst, which is influenced by surface area, promoter concentration, activation temperature, etc. In general, the distribution of products is not drastically altered by variation in contact time. However, long contact times favor the production of larger proportions of higher molecular weight products. In general, shorter contact times are associated with higher temperatures, but, when larger amounts of higher molecular weight products are desired a suitable combination of contact time and temperature is selected.

With proper selection of conditions and contact times, very high efficiency of conversion to desired products can be obtained. Near equilibrium conversion of propylene, about 40 percent, can be obtained, with efficiency of conversion to ethylene and butenes consistently above 95 percent. However, commercial operation as low as 85 percent efficiency or lower can be carried out economically.

In this application, space rates are given in WHSV (weight hourly space velocity; weight of reactant feed per hour per weight of catalyst), and in volume space rates (STP), volume of gaseous reactant feed at standard temperature and pressure per minute, per volume of catalyst.

With a fixed bed reactor, continuous flow operation at pressures in the range of about 500 p.s.i.g., with catalysts having a density of about 0.6 gram per cc. and a surface area of about 100 to 300 m.$^2$/g., and at temperatures in the range of about 325° F., weight hourly space velocities in the range of 0.1 to 1000 parts by weight of hydrocarbon feed per part by weight of catalyst per hour are suitable, with excellent results having been obtained in the range of 0.5 to 20. With propylene feed, high conversion and efficiency in commercial operation can be obtained in the range of 3 to 10. The space velocity is adjusted according to changes in density of feed due to change of pressure or temperature, and variation in reaction temperature and the activity of the catalyst. The higher space velocities in general are associated with higher reaction temperatures. In general contact times in the range of 0.5 second to 10 hours are used. For gas phase operation, contact times of 1 to 200 seconds generally are used with excellent results being obtained in the range of 5 to 100 seconds. For liquid phase operation contact times of 1 minute to 4 hours are preferred. Longer contact time, for example, in the range of 6–24 hours, especially in batch-type reaction, can be used where it is desired to increase the ratio of higher molecular weight materials to lower molecular weight materials.

In the drawing olefin feed line 11 is connected with reactor 12. The effluent line 13 from reactor 12 is connected with separator 14. A lighter fraction is taken overhead from separtor 14 through line 15 and a heavier fraction taken from the bottom through line 16. A diluent source (not shown) is connected to line 17 which is provided with valve 18. In operation, an olefin-containing stream is fed through line 11 into reactor 12 where it is contacted with a disproportionation catalyst under disproportionation conditions as described above. If desired a diluent is fed through line 17 by opening valve 18.

The disproportionation reaction can be carried out either in the presence or absence of a diluent. Diluents selected from the group consisting of paraffinic and cycloparaffinic hydrocarbons can be employed. Suitable diluents are, for example, propane, cyclohexane, methylcyclohexane, normal pentane, normal hexane, isooctane, dodecane, and the like, or mixtures therof, including primarily those paraffins and cycloparaffins having up to 12 carbon atoms per molecule. The diluent should be non-reactive under the conditions of the disproportionation reaction.

At the end of the reaction period, the hydrocarbon phase is separated from the solid catalyst by known methods and subjected to product recovery. Such techniques as fractionation, solvent extraction, and the like, can be employed for separation of products. Separator 14 can be a fractional distillation column with the lighter product with the lighter product of disproportionation passing overhead through line 15 and the heavier product of disproportionation being removed through line 16. Unconverted feed materials or products not in the desired range can be recycled. The following examples illustrate the process of this invention, but are not intended to unduly limit the invention.

EXAMPLE I

One catalyst comprising 12.8 weight percent $MoO_3$, 3.8 weight percent CoO and 83.4 weight percent $Al_2O_3$, another catalyst comprising 9 weight percent $MoO_3$ and 91 weight percent $Al_2O_3$ and still another catalyst comprising 4 weight percent CoO and 96 weight percent $Al_2O_3$ were tested for activity with a feed of dry butene-1 at 250° F. and 500 p.s.i.g. Each of the catalysts was activated at 1000° F. for about five hours prior to the test. The reactions were carried out in a stirrer equipped batch reactor under comparable conditions in 2-hour runs. The effluent was sampled and analyzed chromatographically for degree of conversion and product identity. The results are shown in Table I.

*Table II*

DISPROPORTIONATION OF OLEFINS WITH $MoO_3$-CoO-$Al_2O_3$ CATALYST

| Feed | 1-Butene | 2-Butene | 1-Octene | 1-Dodecene |
|---|---|---|---|---|
| Catalyst Activated at 1000° F. in— | | | | |
| Air, hours | 5 | 2 | 2 | 4 |
| Nitrogen, hours | | 2 | 2 | |
| Reaction Conditions: | | | | |
| Temp., ° F | 250 | 250 | 250 | 250 |
| Pressure, p.s.i.g | 400 | 340 | 60–105 | 15–40 |
| Conversion, percent: | | | | |
| Disproportionation | 71.9 | 23.0 | 92.3 | 91.7 |
| Isomerization | 19.1 | 0.0 | | |
| Disproportionated Product Distribution, mole percent: | | | | |
| Ethylene | 3 | | 1.5 | |
| Propylene | 42 | 63.2 | 10.5 | 0.8 |
| Butenes | Feed | Feed | 9.6 | 3.9 |
| Pentenes | 24 | 26.3 | 9.7 | 5.2 |
| $C_6$ | 12 | 1.9 | 9.2 | 4.6 |
| $C_7$ | 7 | 2.4 | Feed | 4.9 |
| $C_8$ | 4 | 5.9 | 9.3 | 5.2 |
| $C_9$ | 3 | 0.3 | 9.4 | 6.8 |
| $C_{10}$ | 2 | | 8.7 | 8.2 |
| $C_{11}$ | 1 | | 7.8 | Feed |
| $C_{12}$ | 2 | | 6.6 | 9.4 |
| $C_{13}$ | | | 6.2 | 8.6 |
| $C_{14}$ | | | 4.7 | 6.7 |
| $C_{15}$ | | | 2.4 | 5.4 |
| $C_{16}$ | | | 1.8 | 5.2 |
| $C_{17}$ | | | 1.0 | 5.4 |
| $C_{18}$ | | | 0.8 | 4.7 |
| $C_{19}$ | | | 0.6 | 4.4 |
| $C_{20}$ | | | 0.2 | 3.4 |
| $C_{21}$ | | | | 3.0 |
| $C_{22}$ | | | | 2.6 |
| $C_{23}$ | | | | 0.9 |
| $C_{24}$ | | | | 0.4 |
| $C_{25}$ | | | | 0.3 |
| $C_{26}$ | | | | |

*Table I*

COMPARISON OF CATALYST FOR DISPROPORTIONATION ACTIVITY

| Catalyst | 1-Butene Conversion | | Disproportionation Product Distribution, Mole Percent | | | | Feed/Catalyst, Wt. Ratio |
|---|---|---|---|---|---|---|---|
| | Disproportionation, Percent | Isomerization, Percent | $C_2^=$ | $C_3^=$ | $C_5^=$ | $C_6^=+$ | |
| $MoO_3$-CoO-$Al_2O_3$ | 71.9 | 19.1 | 3 | 42 | 24 | 31 | 8.9 |
| $MoO_3$-$Al_2O_3$ | 43.9 | 12.3 | 18 | 36 | 24 | 22 | 5.2 |
| CoO-$Al_2O_3$ | 0 | 5.0 | | | | | 5.5 |

EXAMPLE II

Several olefins were subjected to a disproportionation process in one liter stirrer equipped reactor runs. Each 2-hour run utilized 50 cc. (27 g.) of a 12.8 weight percent $MoO_3$, 3.8 weight percent CoO and 83.4 weight percent $Al_2O_3$ catalyst, the same composition as that used in Example I, and 180–250 g. dried olefin feed. Following the reaction period, the contents of the reactor were analyzed for conversion and products. The essential conditions and results are illustrated in Table II.

EXAMPLE III

A number of runs were made in which 1-butene was utilized as a feed for a disproportionation reaction to observe the effects of different catalyst activation and pretreatment techniques. In each one liter stirrer equipped reactor run 50 cc. (27 g.) of the catalyst and 250 g. of dry 1-butene were fed. Each run was carried out for 2 hours at 250° F. and 400 p.s.i.g. The catalyst was a composition of $MoO_3$—CoO—$Al_2O_3$ of the same proportions as described in Example I. The essential conditions and results are illustrated in Table III.

Table III
EFFECT OF ACTIVATION AND REDUCTION TECHNIQUES ON MoO$_3$—CoO—Al$_2$O$_3$ CATALYST

| Catalyst Activation (1,000° F.): | | | | | | | |
|---|---|---|---|---|---|---|---|
| With Air, Hrs | 5 | 0 | 0 | 0 | 2 | 2 | 0 |
| With Nitrogen, Hrs | 0 | 5 | 6 | 5 | 2 | 2 | 5 |
| Catalyst Treatment: | | | | | | | |
| Gas | | | CO | CO | CO | H$_2$ | H$_2$ |
| Temperature, °F | | | 285 | 550 | 1,000 | 700 | 1,000 |
| Pressure, p.s.i.a | | | 415 | 15 | 15 | 15 | 15 |
| Time, Hrs | | | 3 | 1 | 2 | 2 | 3 |
| Butene Conversion, Percent: | | | | | | | |
| Disproportionation | 71.9 | 64.9 | 65.4 | 67.7 | 56.3 | 2.4 | 4.2 |
| Isomerization | 19.1 | 18.8 | 14.3 | 23.1 | 13.7 | 28.5 | 55.6 |
| Total | 91.0 | 83.7 | 79.7 | 90.8 | 70.0 | 30.9 | 59.8 |
| Disproportionated Product Distribution: | | | | | | | |
| Ethylene, Mol percent | 3 | 5 | 4 | 3 | 11 | 18 | 10 |
| Propylene, Mol percent | 42 | 39 | 44 | 45 | 43 | 24 | 36 |
| Pentenes, Mol percent | 24 | 28 | 35 | 25 | 36 | 15 | 39 |
| Hexenes and Heavier, Mol percent | 31 | 28 | 17 | 27 | 10 | 43 | 15 |

EXAMPLE IV

A number of disproportionation runs utilizing a 1-butene feed were carried out to observe the effects of different reaction temperatures. Each run was performed in a fixed bed reactor containing 100 cc. (54 g.) of a catalyst comprising MoO$_3$—CoO—Al$_2$O$_3$ in the same proportions as described in Example I, which had been activated at 1000° F. for 5 hours in air. The reaction period was 2 hours and the 1-butene (alumina dried) was fed at a weight hourly space velocity of 4 at 450 p.s.i.g. The effluent was chromatographically analyzed and the data obtained as illustrated in Table IV.

Table IV
EFFECT OF REACTION TEMPERATURE

| Temperature, °F | 200 | 250 | 325 | 400 | 570 |
|---|---|---|---|---|---|
| 1-Butene Conversion, percent: | | | | | |
| Disproportionation | 10.7 | 41.1 | 57.3 | 51.8 | 17.1 |
| Isomerization to 2-Butene | 8.9 | 9.4 | 13.9 | 29.6 | 64.5 |
| Total | 19.6 | 50.5 | 71.2 | 81.4 | 82.9 |
| Effluent Composition, Wt. percent: | | | | | |
| Ethylene [1] | 0.9 | 2.3 | 2.0 | 1.5 | Trace |
| Propylene [1] | 0.9 | 10.2 | 15.7 | 18.6 | 3.8 |
| 1-Butene | 80.4 | 49.5 | 28.8 | 18.6 | 17.1 |
| trans 2-Butene | 2.8 | 4.6 | 7.7 | 17.7 | 38.6 |
| cis 2-Butene | 6.1 | 4.8 | 6.2 | 11.9 | 25.9 |
| 1-Pentene [1] | | 0.7 | 1.4 | 1.3 | 0.6 |
| trans 2-Pentene [1] | 1.2 | 8.9 | 13.0 | 12.6 | 3.1 |
| cis 2-Pentene [1] | 0.6 | 3.6 | 5.5 | 5.3 | 1.5 |
| 2-Me-1-butene [1] | | Trace | | Trace | 0.3 |
| 2-Me-2-butene [1] | | Trace | 0.3 | 0.5 | 1.0 |
| n-Butane | | | | | 1.3 |
| C$_6$+ Residue [1] | 7.1 | 15.4 | [2] 19.4 | 12.0 | 6.8 |

[1] Disproportionated product.
[2] This C$_6$+ portion was further analyzed and found to contain hydrocarbons of the following description and quantity: C$_6$—11.9%, C$_7$—2.8%, C$_8$—1.6%, C$_9$—1.1%, C$_{10}$—0.9%, C$_{11}$—0.7%, C$_{12}$—0.4%.

EXAMPLE V

A number of disproportionation runs were made using a feed of alumina dried 1-butene with the MoO$_3$—CoO—Al$_2$O$_3$ catalyst in Example I, with varied feed-catalyst ratios. One hour test runs were carried out in a one liter stirrer equipped reactor at 245° F. and 350–435 p.s.i.g. The catalyst was activated in air for 5 hours at 1000° F. and in nitrogen for 1 hour at 1000° F. At the completion of the reaction period, the contents of the reactor were flashed from the hot reactor into a 1.8 liter bomb at Dry Ice temperature and later analyzed chromatographically. The results of this series of runs are illustrated in Table V.

Table V
EFFECT OF FEED CATALYST RATIO

| Catalyst, g | 3.7 | 7.7 | 17.9 | 33.9 |
|---|---|---|---|---|
| 1-Butene, g | 253 | 257 | 210 | 257 |
| Ratio 1-Butene/Catalyst | 68 | 33 | 12 | 7.6 |
| 1-Butene Conversion, percent | | | | |
| Disproportionation | 1.1 | 4.0 | 22.1 | 35.7 |
| Isomerization | 4.4 | 5.8 | 19.6 | 12.3 |
| Total | 5.5 | 9.8 | 41.7 | 48.0 |
| Effluent Composition, Wt. percent: | | | | |
| Ethylene [1] | 0.06 | 0.6 | 1.5 | 3.5 |
| Propylene [1] | 0.04 | 0.5 | 4.9 | 8.4 |
| 1-Butene | 94.5 | 90.2 | 58.3 | 52.0 |
| trans 2-Butene | 1.9 | 2.3 | 9.6 | 5.3 |
| cis 2-Butene | 2.5 | 3.5 | 10.0 | 7.0 |
| 1-Pentene [1] | Trace | | 0.1 | 0.2 |
| trans 2-Pentene [1] | Trace | 0.3 | 4.2 | 6.9 |
| cis 2-Pentene [1] | Trace | 0.1 | 1.7 | 2.7 |
| C$_6$+[1] | 1.0 | 2.5 | 9.7 | 14.0 |

[1] Disproportionated product.

EXAMPLE VI

A series of runs identical with those of Example V except that the contact time was varied, were made, with the results illustrated in Table VI.

Table VI
EFFECT OF CONTACT TIME

| Contact Time, Min | 30 | 60 | 120 |
|---|---|---|---|
| Catalyst, g | 34.1 | 33.9 | 35.4 |
| 1-Butene, g | 255 | 257 | 252 |
| Ratio 1-Butene/Catalyst | 7.5 | 7.6 | 7.1 |
| 1-Butene Conversion, percent | | | |
| Disproportionation | 12.4 | 35.7 | 54.1 |
| Isomerization | 9.3 | 12.3 | 9.2 |
| Total | 21.7 | 48.0 | 63.3 |
| Effluent Composition, Wt. percent: | | | |
| Ethylene [1] | 0.1 | 3.5 | 4.2 |
| Propylene [1] | 2.7 | 8.4 | 14.8 |
| 1-Butene | 78.3 | 52.0 | 36.7 |
| trans 2-Butene | 3.7 | 5.3 | 4.9 |
| cis 2-Butene | 5.6 | 7.0 | 4.3 |
| 1-Pentene [1] | 0.1 | 0.2 | 0.4 |
| trans 2-Pentene [1] | 1.9 | 6.9 | 12.4 |
| cis 2-Pentene [1] | 0.8 | 2.7 | 5.0 |
| C$_6$+[1] | 6.8 | 14.0 | 17.3 |

[1] Disproportionated product.

EXAMPLE VII

Propylene was disproportionated in several 2 hour trials at different temperatures. The reaction was carried out in a tubular fixed bed reactor with 100 cc. of the previously described MoO$_3$—CoO—Al$_2$O$_3$ catalyst and at a weight hourly space velocity (WHSV) of 3.5 to 4.3 for the propylene (pretreated by passing through alumina) feed. The catalyst was air activated for 5 hours at 1000° F. The reaction pressure was maintained at 450 p.s.i.g. A sample of the total effluent was analyzed by chromatography. The results of the runs may be found in Table VII.

Table VII
PROPYLENE DISPROPORTIONATION

| Temperature, °F | 200 | 325 | 400 | 570 |
|---|---|---|---|---|
| Propylene Conversion, percent | 17.9 | 37.2 | 42.6 | 14.6 |
| Disproportionation, percent | 17.9 | 37.1 | 42.4 | 13.1 |
| Effluent Composition, Wt. Percent: | | | | |
| Ethylene [1] | 6.0 | 10.0 | 11.6 | 1.9 |
| Propylene | 82.1 | 62.8 | 57.4 | 85.4 |
| 1-Butene [1] | 0.1 | 1.9 | 3.4 | 2.5 |
| trans 2-Butene [1] | 7.3 | 14.6 | 13.9 | 2.7 |
| cis 2-Butene [1] | 3.4 | 7.5 | 7.8 | 1.5 |
| 1-Pentene [1] | | Trace | 0.2 | 0.2 |
| trans 2-Pentene [1] | | 0.6 | 1.2 | 0.7 |
| cis 2-Pentene [1] | | 0.2 | 0.5 | 0.4 |
| 2-Me-1-butene [1] | | Trace | 0.1 | Trace |
| 2-Me-2-butene [1] | | 0.4 | 0.4 | 0.2 |
| C$_6$+ Residue [1] | 1.1 | 1.8 | 3.3 | 2.9 |
| Propane | Trace | 0.1 | 0.2 | 1.5 |
| Isobutane [1] | | Trace | Trace | 0.1 |
| n-Pentane [1] | | 0.1 | Trace | |

[1] Disproportionated product.

EXAMPLE VIII

The hydrocarbon 2-butene was disproportionated at a 3.2–3.7 WHSV at several temperatures. All other conditions were identical to those of Example VII. The results may be seen in Table VIII.

Table VIII
2-BUTENE DISPROPORTIONATION

| Temperature, °F | (Feed Comp.) | 250 | 320 | 390 |
|---|---|---|---|---|
| 2-Butene Conversion, percent: | | | | |
| Disproportionation | | 11.9 | 21.5 | 34.0 |
| Isomerization to 1-Butene | | 0.3 | 0.9 | 5.1 |
| Total Conversion | | 12.3 | 22.5 | 39.2 |
| Effluent Composition, Wt. percent: | | | | |
| Ethylene [1] | | Trace | Trace | 0.2 |
| Propylene [1] | | 2.7 | 6.8 | 10.8 |
| n-Butane | | 0.1 | 0.1 | 0.1 |
| 1-Butene | Trace | 0.3 | 0.9 | 5.1 |
| Trans-2-Butene | 84.3 | 61.2 | 53.4 | 41.9 |
| cis 2-Butene | 15.7 | 26.5 | 24.1 | 18.9 |
| 1-Pentene [1] | | Trace | Trace | 0.7 |
| 2-Me-1-butene [1] | | Trace | 0.1 | 0.1 |
| 2-Me-2-butene [1] | | 0.2 | 0.6 | 0.4 |
| trans 2-Pentene [1] | | 3.0 | 6.3 | 9.4 |
| cis 2-Pentene [1] | | 1.0 | 2.4 | 3.9 |
| $C_6$+ Residue [1] | | 5.0 | 5.3 | [2] 8.5 |

[1] Disproportionated product.
[2] This $C_6$ portion was further analyzed and found to contain hydrocarbons of the following description and quantity: $C_6$—3.4%, $C_7$—1.8%, $C_8$—2.5%, $C_9$—0.8%.

EXAMPLE IX

The hydrocarbon 1-pentene was diluted with 4 parts by weight of n-pentane and subjected to a disproportionation reaction at a feed rate (olefin and diluent) of 4 WHSV. In all other respects the series of runs, which were carried out at several temperatures, was identical to those of Example VII. The results may be seen in Table IX.

Table IX
1-PENTENE DISPROPORTIONATION

| Temperature, °F | (Feed Comp.) | 200 | 325 | 570 |
|---|---|---|---|---|
| 1-Pentene Conversion, Percent: | | | | |
| Disproportionation | | 37.5 | 79.3 | 26.6 |
| Isomerization to 2-pentene | | 13.2 | 12.5 | 61.8 |
| Total Conversion | | 50.7 | 91.8 | 88.4 |
| Effluent Composition, Wt. Percent: [2] | | | | |
| Ethylene [1] | | 1.0 | trace | trace |
| Propylene [1] | | 5.1 | 5.2 | 1.7 |
| 1-Butene [1] | Trace | 5.1 | 3.0 | 1.7 |
| trans 2-Butene [1] | | 1.0 | 7.8 | 3.3 |
| cis 2-Butene [1] | | 1.0 | 3.9 | 2.2 |
| 3-Me-1-butene | 2.0 | 1.0 | | Trace |
| 1-Pentene | 96.0 | 47.3 | 6.9 | 9.4 |
| 2-Me-1-butene | 2.0 | 1.0 | 1.3 | 2.2 |
| trans 2-Pentene | | 7.1 | 8.6 | 41.9 |
| cis 2-Pentene | | 6.1 | 3.9 | 19.9 |
| 3-Me-2-Pentene [1] | | 2.5 | 0.9 | 5.5 |
| $C_6$ [1] | | 2.5 | 12.9 | 9.4 |
| $C_7$+ Residue [1] | | 19.3 | 45.6 | 2.8 |

[1] Disproportionated product.
[2] Diluent free basis.

EXAMPLE X

The hydrocarbon 2-pentene was subjected to a disproportionation reaction under conditions essentially identical to those of Example IX. A diluent, n-pentane, was similarly used. The results may be seen in Table X.

Table X
DISPROPORTIONATION OF 2-PENTENE

| Temperature, °F | (Feed Comp.) | 200 | 325 | 570 |
|---|---|---|---|---|
| 2-Pentene Conversion, Percent: | | | | |
| Disproportionation | | 35.3 | 59.3 | 21.0 |
| Isomerization to 1-Pentene | | 0 | 0.5 | 7.8 |
| Total | | 35.3 | 59.8 | 30.4 |
| Effluent Composition, wt. percent: [2] | | | | |
| Propylene [1] | | 0.5 | 2.6 | 2.1 |
| 1-Butene [1] | Trace | 0.5 | 2.1 | 1.6 |
| trans 2-Butene [1] | | 8.3 | 11.8 | 3.7 |
| cis 2-Butene [1] | | 4.2 | 6.7 | 2.1 |
| 1-Pentene | | Trace | 0.5 | 7.8 |
| 2-Me-1-butene | 1.0 | 0.9 | 1.0 | 1.0 |
| trans 2-Pentene | 82.7 | 50.4 | 28.9 | 47.1 |
| cis 2-Pentene | 16.3 | 13.4 | 10.3 | 21.5 |
| 2-Me-2-Butene | | Trace | Trace | 1.6 |
| $C_6$ [1] | | 14.8 | 20.1 | 7.8 |
| $C_7$+ Residue [1] | | 7.0 | 16.0 | 3.7 |

[1] Disproportionated products.
[2] Diluent free basis.

EXAMPLE XI

The hydrocarbon 2-methyl-1-butene was subjected to disproportionation under conditions essentially identical to those of Example IX. A diluent, n-pentane, was similarly used. The results may be seen in Table XI.

Table XI
DISPROPORTIONATION OF 2-METHYL-1-BUTENE

| Temperature, °F | (Feed Comp.) | 200 | 325 | 570 |
|---|---|---|---|---|
| Disproportionation, percent | | 70.6 | 79.5 | 20 |
| Effluent Composition, Wt. percent: [2] | | | | |
| Propylene [1] | | | 0.6 | 0.6 |
| 1-Butene [1] | | 0.7 | 1.7 | 4.6 |
| 2-Butene [1] | | 1.4 | 2.8 | 1.7 |
| 2-Me-1-butene | 74.1 | 4.8 | 3.9 | 18.3 |
| 2-Me-2-butene | 25.9 | 24.6 | 16.0 | 60.6 |
| trans 2-pentene | | | 0.6 | 1.1 |
| $C_6$ [1] | | 6.2 | 10.6 | 5.1 |
| $C_7$+ Residue [1] | | 62.3 | 63.8 | 8.0 |

[1] Disproportionated products.
[2] Diluent free basis.

EXAMPLE XII

The hydrocarbon 3-methyl-1-butene was subjected to disproportionation under conditions essentially identical to those of Example IX. A diluent, n-pentane, was similarly used. The results may be seen in Table XII.

Table XII
DISPROPORTIONATION OF 3-METHYL-1-BUTENE

| Temperature, °F | (Feed Comp.) | 200 | 325 | 570 |
|---|---|---|---|---|
| Disproportionation, percent | | 21.5 | 69.3 | 27.8 |
| Effluent Composition, Wt. percent: [2] | | | | |
| Ethylene [1] | | 1.3 | Trace | Trace |
| Propylene [1] | | 3.4 | 1.9 | 0.5 |
| Isobutane [1] | | Trace | 0.6 | 0.5 |
| 1-Butene | 1.6 | 1.3 | 2.6 | 4.1 |
| 2-Butene | 2.1 | 1.3 | 3.8 | 2.0 |
| 3-Me-1-butene | 93.7 | 62.5 | 6.4 | 3.1 |
| 2-Me-1-butene | 2.6 | 2.7 | 3.8 | 15.4 |
| trans 2-Pentene | | | 0.6 | 1.0 |
| 2-Me-2-butene | | 10.7 | 13.5 | 46.6 |
| $C_6$ [1] | | | 3.8 | 3.1 |
| $C_7$+ Residue [1] | | 16.8 | 63.0 | 23.7 |

[1] Disproportionated products.
[2] Diluent free basis.

EXAMPLE XIII

The hydrocarbon 1-hexene was subjected to disproportionation under conditions essentially identical to those of Example IX. A diluent, n-pentane, was similarly used. The results may be seen in Table XIII.

*Table XIII*

DISPROPORTIONATION OF 1-HEXENE

| Temperature, °F | (Feed Comp.) | 200 | 325 | 575 |
|---|---|---|---|---|
| Disproportionation, Percent | | 37.2 | 66.0 | 14.9 |
| Effluent Composition, Wt. Percent:[2] | | | | |
| Ethylene [1] | | 0.6 | Trace | Trace |
| Propylene [1] | | 5.0 | 4.7 | 1.6 |
| 1-Butene [1] | | 2.2 | 2.9 | 1.1 |
| 2-Butene [1] | | 2.8 | 11.2 | 2.7 |
| 1-Pentene [1] | | 4.4 | 2.4 | 0.5 |
| 2-Me-1-butene | 1.0 | 1.1 | 1.2 | 1.1 |
| 2-Pentene [1] | | 2.2 | 10.0 | 3.2 |
| 1-Hexene | 98.5 | 35.2 | 6.5 | 5.8 |
| Other C$_6$ olefins | | 24.3 | 23.4 | 77.1 |
| C$_7$[1] | | 7.2 | 15.2 | 3.2 |
| C$_8$[1] | | 3.9 | 8.8 | 2.1 |
| C$_9$[1] | | 5.5 | 6.5 | 1.1 |
| C$_{10}$[1] | | 5.0 | 4.2 | 0.5 |
| C$_{11}$[1] | | 0.6 | 1.8 | |
| C$_{12}$[1] | | | 1.2 | Trace |

[1] Disproportionated product.
[2] Diluent free basis.

EXAMPLE XIV

The hydrocarbon 1-octene was subjected to disproportionation under conditions essentially identical to those of Example IX. A diluent, n-pentane, was similarly utilized. The results may be seen in Table XIV.

*Table XIV*

DISPROPORTIONATION OF 1-OCTENE

| Temperature, °F | (Feed Comp.) | 200 | 325 | 570 |
|---|---|---|---|---|
| Disproportionation, percent | | 49.3 | 75.3 | 12.5 |
| Effluent Composition, Wt. percent:[2] | | | | |
| Ethylene [1] | | Trace | Trace | Trace |
| Propylene [1] | | 1.7 | 1.4 | 0.4 |
| 1-Butene [1] | | 0.4 | 1.0 | 0.4 |
| 2-Butene [1] | | 1.2 | 3.9 | 0.9 |
| 2-Me-1-butene | 1.5 | Trace | 0.5 | Trace |
| 2-Pentene [1] | | 1.2 | 3.4 | 1.7 |
| 2-Me-2-butene [1] | | Trace | 1.0 | Trace |
| C$_7$[1] | | 10.0 | 11.1 | 3.0 |
| C$_8$ | 98.5 | 50.7 | 24.2 | 87.5 |
| C$_9$[1] | | 11.3 | 14.6 | 2.6 |
| C$_{10}$[1] | | 3.4 | 10.6 | 1.3 |
| C$_{11}$[1] | | 3.4 | 7.2 | 2.2 |
| C$_{12}$[1] | | 4.6 | 6.8 | |
| C$_{13}$[1] | | 6.3 | 5.3 | |
| C$_{14}$[1] | | 5.0 | 4.3 | |
| C$_{15}$[1] | | 0.8 | 1.9 | |
| C$_{16}$[1] | | Trace | 1.4 | |
| C$_{17}$[1] | | | 1.4 | |

[1] Disproportionated product.
[2] Diluent free basis.

EXAMPLE XV

Propylene was disproportionated over a catalyst containing 3.4 weight percent CoO, 11.0 weight percent MoO$_3$ and 85.6 weight percent Al$_2$O$_3$, having a surface area of 280 m.$^2$/g. and a bulk density of 0.60 g./cc. The catalyst was activated at 1000° F. with air for 5 hours and a plurality of runs made by contacting the catalyst with a stream of 60 weight percent propylene and 40 weight percent propane feed at a rate of 4 g./min. The following data were obtained:

*Table XV*

| | 225 p.s.i.g. | | | | | | | | |
|---|---|---|---|---|---|---|---|---|---|
| Temperature, F | 269 | 282 | 272 | 304 | 327 | 323 | 364 | 375 | 364 |
| Catalyst, Grams | 34.9 | 16.7 | 8.3 | 34.7 | 17.6 | 8.8 | 35.5 | 17.7 | 8.3 |
| WHSV | 7.0 | 15.5 | 26.9 | 7.4 | 13.1 | 28.2 | 6.8 | 13.4 | 28.5 |
| Propylene Conversion, percent | 21.9 | 18.1 | 5.9 | 29.0 | 18.9 | 15.7 | 30.1 | 27.4 | 9.2 |
| Product Distribution, Wt. percent: | | | | | | | | | |
| Ethylene | 34.3 | 34.5 | 32.8 | 31.9 | 36.5 | 35.5 | 33.5 | 34.6 | 33.0 |
| 1-Butene | 1.8 | 1.9 | 1.0 | 3.2 | 2.1 | 2.1 | 6.1 | 4.9 | 3.2 |
| trans-2-Butene | 39.8 | 38.8 | 39.4 | 41.0 | 38.2 | 38.9 | 35.5 | 36.7 | 38.7 |
| cis-2-Butene | 24.1 | 21.2 | 26.8 | 23.5 | 23.2 | 22.2 | 20.1 | 21.2 | 25.1 |
| C$_5$+ | 0.0 | 3.6 | 0.0 | 0.4 | 0.0 | 1.3 | 4.8 | 2.6 | 0.0 |
| | 450 p.s.i.g. | | | | | | | | |
| Temperature, F | 262 | 271 | 269 | 305 | 323 | 325 | 370 | 357 | 373 |
| Catalyst, Grams | 35.0 | 17.1 | 8.4 | 35.1 | 17.6 | 9.2 | 35.8 | 17.5 | 8.7 |
| WHSV | 6.2 | 14.2 | 26.0 | 7.1 | 13.6 | 25.5 | 6.9 | 14.1 | 27.8 |
| Propylene Conversion, percent | 35.4 | 18.4 | 8.8 | 34.7 | 34.2 | 20.3 | 28.2 | 32.3 | 16.1 |
| Product Distribution, Wt. percent: | | | | | | | | | |
| Ethylene | 32.9 | 36.3 | 33.5 | 33.6 | 34.7 | 33.8 | 32.9 | 32.7 | 34.2 |
| 1-Butene | 2.2 | 1.3 | 0.9 | 3.8 | 2.6 | 2.1 | 5.5 | 4.8 | 3.8 |
| trans-2-Butene | 40.5 | 38.2 | 40.0 | 38.4 | 39.8 | 38.8 | 36.2 | 36.2 | 37.1 |
| cis-2-Butene | 20.2 | 23.0 | 25.6 | 20.0 | 21.1 | 22.3 | 22.2 | 21.6 | 23.8 |
| C$_5$+ | 4.2 | 1.2 | 0.0 | 4.2 | 1.8 | 3.0 | 3.3 | 4.7 | 1.1 |

This example shows high efficiency production of ethylene and butene from propylene at high conversion.

EXAMPLE XVI

A 20–40 mesh quantity of catalytic grade alumina was impregnated with aqueous ammonium tungstate solution. After drying on a steam bath the particulate composite, containing about 10 weight percent tungsten oxide, was charged into a 7 millimeter I.D. externally heated glass reaction tube to form a 5-milliliter catalyst bed. A 2-milliliter quantity of glass beads was placed in a layer ahead of the catalyst bed. While in the reactor, the catalyst bed was activated by heating at 1000° F. for 4 hours in the presence of flowing air. Following this, the bed was flushed with nitrogen while cooling to a temperature of 200° F.

After the catalyst activation, a dried stream of propylene was passed through the catalyst bed at a gaseous space rate of 10 v./v./min. and at atmospheric pressure. The effluent was periodically sampled for chromatographic analysis. Results obtained at several reaction temperatures are shown in the table below:

*Table XVI*

| Temperature, °F | 200 | 250 | 300 | 350 |
|---|---|---|---|---|
| Propylene Conversion, percent | 0.7 | 3.2 | 6.1 | 7.4 |
| Product Distribution, wt. percent: | | | | |
| Ethylene | 44.0 | 36.6 | 33.3 | 20.2 |
| Propane | 0.0 | 0.0 | Trace | 18.9 |
| n-Butane | 0.0 | 0.0 | Trace | 12.2 |
| 1-Butene | 4.0 | 8.7 | 13.5 | 25.7 |
| trans-2-Butene | 29.3 | 32.2 | 32.7 | 12.2 |
| cis-2-Butene | 22.7 | 22.5 | 20.5 | 10.8 |

The presence of ethylene as well as butenes in the reactor effluent indicates that the process utilizing tungsten oxide catalyst is effective for the disproportionation of propylene.

EXAMPLE XVII

A propylene disproportionation reaction was carried out using the fluidized catalyst contacting technique. The continuous reaction was carried out at 450 p.s.i.g. and 325° F. A preheated feed containing propylene diluted with propane was preheated and passed into a 3300 cc. capacity fluidized catalyst reactor (similar to a confined bed fluid cat cracker) having a vertical cylindrical chamber the lower end of which was mounted at the wide end of a conical section. The gas was fed into the bottom of the reactor at the narrow end of the conical section from whence it flowed up through the loose catalyst contained therein and out of the reaction zone through a filter at the upper end of the chamber. The feed gas was pumped through the reactor at a rate of 4.6 lbs. per hour and the reactor effluent was periodically sampled and analyzed.

The reactor contained 405 g. of a microsphere catalyst having the following analysis and properties.

| | | |
|---|---|---|
| $MoO_3$ | wt. percent | 13.0 |
| CoO | wt. percent | 3.6 |
| $SiO_2$ | | 0.15 |
| Fe | | 0.025 |
| Na | | 0.05 |
| $Al_2O_3$ | | remainder |
| Pore volume | ml./g | 0.85 |
| Pore diameter | A | 105 |
| Surface area | M.²/g | 325 |
| Apparent bulk density | g./cc. | 0.45 |
| Particle size, microns: | | |
| 0–20 | percent | 4 |
| 20–40 | do | 16 |
| 40–80 | do | 52 |
| 80 | do | 28 |

The catalyst was activated by heat treating for 5 hr. at 1000–1100° F. with dry air at 6 cu. ft. air/hr. It was then cooled in the presence of dry nitrogen.

The reactor was continuously operated for 13½ hours. The following table shows the effectiveness of the process near the beginning and near the end of that period. The analyses, in wt. percent, described the feed and the nature of the effluent at 1 hr. and after 13 hrs. of operation.

| | Feed | 1 hr. | 13 hr. |
|---|---|---|---|
| Ethylene | 0.03 | 7.09 | 4.87 |
| Propane | 39.61 | 39.48 | 40.05 |
| Propylene | 58.92 | 36.75 | 44.59 |
| Isobutane | 0.08 | 0.13 | 0.07 |
| n-Butane | 0.05 | 0.04 | 0.06 |
| Butene-1 | 0.02 | 0.74 | 0.35 |
| trans-2-butene | 0.72 | 9.35 | 5.84 |
| cis-2-butene | 0.06 | 5.41 | 3.58 |
| $C_5$'s | 0.50 | 0.97 | 0.59 |
| Conversion, percent | | 37.6 | 24.3 |

These data indicate a high degree of effectiveness for disproportionation during the 13½ hrs. of continuous operation. The catalyst at this point was found to contain only 2.14 wt. percent coke based on the weight of the catalyst.

In other similar fluidized runs carried out at 10 p.s.i.g. with essentially identical catalyst, apparatus, and procedure, disproportionation of propylene was found to continue satisfactorily even after 83 hours of continuous operation without catalyst regeneration.

EXAMPLE XVIII

A disproportionation catalyst containing 11.0 wt. percent $MoO_3$, 3.4 wt. percent CoO, and 85.6 wt. percent $Al_2O_3$ was heated in air for 4 hours at 1100° F. Following this, a portion of the catalyst was treated further with carbon monoxide for one hour at 810° F. Each catalyst was used in a separate one hour run with a feed of 60 wt. percent propylene and 40 wt. percent propane at 325° F., 10 p.s.i.g., at 35 v./v./min. (STP). With the portion which was treated with carbon monoxide, the average propylene conversion was 38.3 percent, while with the portion untreated with carbon monoxide the average propylene conversion was 28.4 percent.

Reasonable variation and modification are possible in the scope of my invention which sets forth a process for the disproportionation of olefins by contact with an aluminum oxide catalyst, promoted with molybdenum oxide or tungsten oxide.

I claim:

1. A disproportionation process which comprises contacting an acyclic monoolefin feed having 3 to 20 carbon atoms per molecule with a catalyst activated in an atmosphere compatible with said catalyst to permit activation for disporionation, said catalyst consisting essentially of alumina and between 0.5 and 30 weight percent of at least one oxide selected from the group consisting of molybdenum oxide and tungsten oxide under conditions, including conditions of temperature, pressure and contact time, suitable for obtaining a disproportionated product within a temperature range of 150 to 500° F. and a pressure range of 0 to 1500 p.s.i.g., to produce a disproportionated product comprising higher and lower molecular weight acyclic monoolefins similar to said feed, and recovering said disproportionated product.

2. A disproportionation process which comprises contacting an acyclic monoolefin feed having 3 to 20 carbon atoms per molecule with a catalyst activated in an atmosphere compatible with said catalyst to permit activation for disproportionation, said catalyst consisting essentially of alumina and between 1 and 15 weight percent of at least one oxide selected from the group consisting of molybdenum oxide and tungsten oxide, under conditions, including conditions of temperature, pressure and contact time, suitable for obtaining a disproportionated product within a temperature range of 250–400° F. and a pressure range to 0 to 1500 p.s.i.g. to produce a disproportionated product comprising higher and lower molecular weight acyclic monoolefins similar to said feed, and recovering said disproportionated product.

3. A disproportionation process which comprises contacting propylene with a catalyst activated in an atmosphere compatible with said catalyst to permit activation for disproportionation, said catalyst consisting essentially of an alumina base and between 0.5 and 30 weight percent of a promoter selected from the group consisting of molybdenum oxide and tungsten oxide, under conditions, including conditions of temperature, pressure and contact time, suitable for disproportionating propylene to produce ethylene and butene within a temperature range of 150 to 500° F., a pressure range of 0 to 1500 p.s.i.g., to produce a disproportionation product comprising ethylene and butene, and not more than about 5 weight percent of other reaction products, and recovering said ethylene and butene.

4. A disproportionation process which comprises contacting an acyclic monoolefin feed having 3 to 20 carbon atoms per molecule with a catalyst consisting essentially of alumina and between 0.5 and 30 weight percent of at least one oxide selected from the group consisting of molybdenum oxide and tungsten oxide, under conditions, including conditions of temperature, pressure and contact time, suitable for obtaining a disproportionated product within a temperature range of 150 to 500° F. and a pressure range of 0 to 1500 p.s.i.g., said catalyst having been activated at a temperature in the range of 700 to 1600° F., for a period of 0.5 to 20 hours in a substantially non-reducing atmosphere, said contacting being started without prior substantial reduction of said catalyst, to produce a disproportionated product comprising higher and lower molecular weight acyclic monoolefins similar to said feed, and recovering said disproportionated product.

5. The process of claim 4 wherein said oxide is molybdenum oxide.

6. A disproportionation process which comprises contacting an acyclic monoolefin feed having 3 to 20 carbon atoms per molecule with a catalyst consisting essentially of alumina and between 0.5 and 30 weight percent of at least one oxide selected from the group consisting of molybdenum oxide and tungsten oxide, under conditions, including conditions of temperature, pressure and contact time, suitable for obtaining a disproportionated product within a temperature range of 150 to 500° F. and a pressure range of 0 to 1500 p.s.i.g., said catalyst having been activated at a temperature in the range of 700 to 1600° F., for a period of 0.5 to 20 hours in a substantially non-reducing atmosphere, of one or more gases selected from the group consisting of free oxygen containing gases, nitrogen, gas from an inert atmosphere generator, flue gases, carbon dioxide, helium, neon, argon, krypton, xenon, and radon, said contacting being started without prior substantial reduction of said catalyst, to produce a disproportionated product comprising higher and lower molecular weight acyclic monoolefins similar to said feed, and recovering said disproportionated product.

7. A disproportionation process which comprises contacting an acyclic monoolefin feed having 3 to 20 carbon atoms per molecule with a catalyst consisting essentially of alumina and between 0.5 and 30 weight percent of at least one oxide selected from the group consisting of molybdenum oxide and tungsten oxide, under conditions, including conditions of temperature, pressure and contact time, suitable for obtaining a disproportionated product within a temperature range of 250 to 400° F. and a pressure range of 0 to 1500 p.s.i..g, said catalyst haivng been activated at a temperature in the range of 900 to 1400° F., for a period of 0.5 to 20 hours in a substantially non-reducing atmosphere, said contacting being started without prior substantial reduction of said catalyst, to produce a disproportionated product comprising higher and lower molecular weight acyclic monoolefins similar to said feed, and recovering said disproportionated product.

8. A disproportionation process which comprises contacting an acyclic monoolefin feed having 3 to 20 carbon atoms per molecule with a catalyst consisting essentially of alumina and between 0.5 and 30 weight percent of at least one oxide selected from the group consisting of molybdenum oxide and tungsten oxide, under conditions, including conditions of temperature, pressure and contact time, suitable for obtaining a disproportionated product within a temperature range of 250 to 400° F. and a pressure range of 0 to 1500 p.s.i.g., said catalyst having been activated at a temperature in the range of 900 to 1400° F., for a period of 0.5 to 20 hours in a substantially non-reducing atmosphere, of one or more gases selected from the group consisting of free oxygen containing gases, nitrogen, gas from an inert atmosphere generator, flue gases, carbon dioxide, helium, neon, argon, krypton, xenon, and radon, said contacting being started without prior substantial reduction of said catalyst, to produce a disproportionated product comprising higher and lower molecular weight acyclic monoolefins similar to said feed, and recovering said disproportionated product.

9. A disproportionation process which comprises contacting an acyclic monoolefin feed having 3 to 20 carbon atoms per molecule iwth a catalyst consisting essentially of alumina and between 0.5 and 30 weight percent of at least one oxide selected from the group consisting of molybdenum oxide and tungsten oxide, under conditions, including conditions of temperature, pressure and contact time, suiable for obtaining a disproportionated product within a temperature range of 250 to 400° F. and a pressure range of 0 to 1500 p.s.i.g., said catalyst having been activated at a temperature in the range of 900 to 1400° F., for a period of 0.5 to 20 hours in an atmosphere of a free oxygen containing gas, said contacting being started without prior substantial reduction of said catalyst, to produce a disproportionated product comprising higher and lower molecular weight acyclic monoolefins similar to said feed, and recovering said disproportionated product.

10. A disproportionation process which comprises activating a catalyst consisting essentially of alumina and between 0.5 and 30 weight percent of at least one oxide selected from the group consisting of molybdenum oxide and tungsten oxide at a temperature in the range of 700 to 1600° F., for a period of 0.5 to 20 hours in a substantially non-reducing atmosphere and contacting said catalyst without substantial reduction thereof with an acyclic monoolefin feed having 3 to 20 carbon atoms per molecule, under conditions, including conditions of temperature, pressure and contact time, suitable for obtaining a disproportionated product within a temperature range of 150 to 500° F. and a pressure range of 0 to 1500 p.s.i.g. to produce a disproportionated product comprising higher and lower molecular weight acyclic monoolefins similar to said feed, and recovering said disproportionated product.

11. A disproportionation process which comprises contacting an acyclic monoolefin feed having 3 to 20 carbon atoms per molecule with a catalyst activated in an atmosphere compatible with said catalyst to permit activation for disproportionation, said catalyst consisting essentially of alumina and between 0.5 and 30 weight percent of at least one oxide selected from the group consisting of molybdenum oxide and tungsten oxide under conditions, including conditions of temperature, pressure and contact time, suitable for obtaining a disproportionated product within a temperature range of 150 to 500° F. and a pressure range of 0 to 1500 p.s.i.g., for a time in the range of 0.5 second to 10 hours to produce a disproportionated product comprising higher and lower molecular weight acyclic monoolefins similar to said feed, and recovering said disproportionated product.

12. A disproportionation process which comprises contacting an acyclic monoolefin feed having 3 to 20 carbon atoms per molecule with a catalyst activated in an atmosphere compatible with said catalyst to permit activation for disproportionation, said catalyst consisting essentially of alumina and between 1 and 15 weight percent of at least one oxide selected from the group consisting of molybdenum oxide and tungsten oxide, under conditions, including conditions of temperature, pressure and contact time, suitable for obtaining a disproportionated product within a temperature range of 250–400° F. and a pressure range of 0 to 1500 p.s.i.g. in gas phase operation for a time in the range of 1 to 200 seconds to produce a disproportionated product comprising higher and lower molecular weight acyclic monoolefins similar to said feed, and recovering said disproportionated product.

13. A disproportionation process which comprises contacting an acyclic monoolefin feed having 3 to 20 carbon atoms per molecule with a catalyst activated in an atmosphere compatible with said catalyst to permit activation for disproportionation, said catalyst consisting essentially of alumina and between 1 and 15 weight percent of at least one oxide selected from the group consisting of molybdenum oxide and tungsten oxide, under conditions, including conditions of temperature, pressure and contact time, suitable for obtaining a disproportionated product within a temperature range of 250–400° F. and a pressure range of 0 to 1500 p.s.i.g. in liquid phase operation for a time in the range of 1 minute to 4 hours to produce a disproportionated product comprising higher and lower molecular weight acyclic monoolefins similar to said feed, and recovering said disproportionated product.

14. The process of claim 2 wherein said oxide is molybdenum oxide.

15. A disproportionation process which comprises contacting an acyclic monoolefin feed having 3 to 20 carbon atoms per molecule with a catalyst consisting essentially of alumina and between 0.5 and 30 weight percent of at least one oxide selected from the group consisting of molybdenum oxide and tungsten oxide, within a temperature range of 150 to 500° F. and a pressure range of 0 to 1500 p.s.i.g., said catalyst having been activated first at a temperature in the range of 700 to 1600° F., for a period of 0.5 to 20 hours in an atmosphere of a free oxygen containing gas and then in carbon monoxide at a temperature in the range of 300 to 1200° F. for a period of one minute to five hours at a pressure of 0 to 1000 p.s.i.g., said contacting being started without prior substantial subsequent reduction of said catalyst, to produce a disproportionated product comprising higher and lower molecular weight acyclic monoolefins similar to said feed, and recovering said disproportionated product.

16. The process of claim 6 wherein said oxide is molybdenum oxide.

17. The process of claim 9 wherein said oxide is molybdenum oxide.

18. The process of claim 10 wherein said oxide is molybdenum oxide.

19. A process for the disproportionation of an acyclic monoolefin hydrocarbon having 3 to 20 carbon atoms per molecule which comprises contacting said hydrocarbon under conditions including conditions of temperature, pressure and contact time suitable for obtaining a disproportionated product within a temperature range of 150 to 500° F. and a pressure range of 0 to 1500 p.s.i.g. to produce a disproportionation product comprising higher and lower molecular weight monoolefins similar to said feed with a catalyst consisting essentially of alumina and between 0.5 and 30 weight percent of at least one compound of oxygen and a metal from the group consisting of tungsten and molybdenum, said catalyst being formed by incorporating into an alumina base a compound selected from the group consisting of oxides of said metal and compounds of said metal convertible into the oxide upon calcination, and subjecting to activation under conditions suitable for and in an atmosphere compatible with said catalyst to permit activation for disproportionation and recovering said disproportionated product.

References Cited by the Examiner
UNITED STATES PATENTS 2,692,259 10/1954 Peters _____ 260—683.15
2,825,721 3/1958 Hogan et al. _____ 260—683.15

DELBERT E. GANTZ, *Primary Examiner.*

ALPHONSO D. SULLIVAN, *Examiner.*

C. E. SPRESSER, *Assistant Examiner.*